(12) United States Patent
Klosterman

(10) Patent No.: US 6,453,471 B1
(45) Date of Patent: *Sep. 17, 2002

(54) ELECTRONIC PROGRAMMING GUIDE WITH MOVIE PREVIEW

(75) Inventor: Brian Lee Klosterman, San Ramon, CA (US)

(73) Assignee: Starsight Telecast, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/810,566

(22) Filed: Mar. 3, 1997

Related U.S. Application Data

(60) Provisional application No. 60/032,733, filed on Dec. 13, 1996.

(51) Int. Cl.[7] .......................... H04N 5/445; H04N 7/16; G06F 3/00
(52) U.S. Cl. ........................... 725/41; 725/40; 725/136; 348/563
(58) Field of Search ................................. 348/563, 564, 348/601, 7, 731, 906, 12, 13, 10, 565; 455/4.2, 5.1, 6.2, 6.3, 906; 725/40, 41, 136, 39, 43, 56

(56) References Cited

U.S. PATENT DOCUMENTS

| | | | | |
|---|---|---|---|---|
| 4,230,990 A | * | 10/1980 | Lert, Jr. et al. | 455/4.1 |
| 5,166,886 A | * | 11/1992 | Molnar et al. | 700/234 |
| 5,499,046 A | * | 3/1996 | Schiller et al. | 348/6 |
| 5,499,103 A | * | 3/1996 | Mankovitz | 386/96 |
| 5,523,796 A | | 6/1996 | Marshall et al. | 348/589 |
| 5,541,738 A | * | 7/1996 | Mankovitz | 386/83 |
| 5,585,858 A | * | 12/1996 | Harper et al. | 348/485 |
| 5,594,509 A | * | 1/1997 | Florin et al. | 348/731 |
| 5,600,364 A | * | 2/1997 | Hendricks et al. | 348/1 |
| 5,604,544 A | * | 2/1997 | Bertram | 348/601 |
| 5,619,249 A | * | 4/1997 | Billock et al. | 348/7 |
| 5,657,072 A | * | 8/1997 | Aristides et al. | 348/13 |
| 5,710,601 A | * | 1/1998 | Marshall et al. | 348/564 |
| 5,751,282 A | * | 5/1998 | Girard et al. | 345/327 |
| 5,752,160 A | * | 5/1998 | Dunn | 455/5.1 |
| 5,815,145 A | * | 9/1998 | Matthews, III | 345/327 |
| 5,822,324 A | * | 10/1998 | Kostresti et al. | 370/487 |
| 5,861,906 A | * | 1/1999 | Dunn et al. | 348/7 |
| 5,907,323 A | * | 5/1999 | Lawler et al. | 345/327 |
| 6,201,536 B1 | * | 3/2001 | Hendricks et al. | 345/327 |

OTHER PUBLICATIONS

Written Opinion from corresponding PCT application No. PCT/US97/23026, 4 pages.
International Search Report from corresponding PCT application No. PCT/US97/23026, 4 pages.
Copy of claims form corresponding PCT application No. PCT/US97/23026, 4 pages.

* cited by examiner

Primary Examiner—Safet Metjahic
Assistant Examiner—Uyen Le
(74) Attorney, Agent, or Firm—Christie, Parker & Hale, LLP

(57) ABSTRACT

A preview system activated from an on-screen programming guide displays a video preview of a selected particular program on the display screen. The video preview is displayed on less than the full screen so that the video can be highly-compressed to save bandwidth.

18 Claims, 9 Drawing Sheets

FIG.5A

CHANNEL DATA TABLE

| | 7 | 6 | 5 | 4 | 3 | 2 | 1 | 0 | |
|---|---|---|---|---|---|---|---|---|---|
| 0x00 | | | | TYPE=0x01 | | | | | |
| 0x01 | | | | NBR BLOCKS | | | | | |
| 0x02 | | | | 0x00 | | | | | 0x00 |
| 0x03 | | | | NBR CHANNELS | | | | | |
| 0x04 | MSB | | | CHANNEL ID | | | | LSB | 0x02 |
| 0x06 | DPF | ICF | NDF | ////// | NF | TMSB | | | 0x03 |
| 0x07 | | | | TUNE CHANNEL NBR | | | | | 0x04 |
| 0x08 | | | | TRANSPONDER NBR | | | | | 0x05 |
| 0x09 | | | | SATELLITE NBR | | | | | 0x06 |
| 0x0A | ////// | SOURCE | CHANNEL TYPE | NMSB | | | | | 0x07 |
| 0x0B | | | | NATIVE CHANNEL NBR | | | | | 0x08 |
| 0x0C | | | | NAME MASK BITS | | | | | 0x09 |
| 0x0D | | | | FAVORITES LINK | | | | | 0x0A |
| 0x0E | MSB | | | SHOWLIST HANDLE TABLE HANDLE | | | | LSB | 0x0C |
| 0x10 | MSB | | | NAME AFFILIATION STRING | | | | LSB | |
| 0x18 | MSB | | | DUPLICATE CHANNELS HANDLE | | | | LSB | 0x14 |

FIG.5B

SHOW LIST

| | 7 | 6 | 5 | 4 | 3 | 2 | 1 | 0 | |
|---|---|---|---|---|---|---|---|---|---|
| 0x00 | | | | TYPE=0x02 | | | | | |
| 0x01 | | | | NBR BLOCKS | | | | | |
| 0x02 | ////// | | | VERSION | | | | | |
| 0x03 | MSB | | | START TIME GMT | | | | LSB | |
| 0x07 | | | | START DELIMITER=0xEE | | | | | 0x00 |
| 0x08 | RESV | ////// | PPV | GRPF | DIDF | DMYF | | | 0x01 |
| 0x09 | | | | DURATION | | | | | 0x02 |
| 0x0A | MSB | | | SHOW TITLE HANDLE | | | | LSB | 0x04 |
| 0x0C | MSB | | | SHOW DESCRIPTION HANDLE | | | | LSB | |
| 0x0E | MSB | | | GROUP ID | | | | LSB | 0x06 |
| | | | | END DELIMITER=0xFF | | | | | |

ELECTRONIC PROGRAMMING GUIDE WITH MOVIE PREVIEW

This application claims the benefit of provisional application Ser. No. 60/032,733 filed on Dec. 13, 1996.

BACKGROUND OF THE INVENTION

The present invention generally relates to television schedule information, and more particularly to a system and method for providing previews of scheduled programming to assist a viewer in making scheduling decisions.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased.

Additionally, television faces a digital future that will see the merger of television and PC technology. The television set of the future will include a micro-computer, a modem of interconnectivity with other computers over networks, intranets, and the internet, and be connectable to computer peripherals such as printers. Such capabilities as near "video on demand" (NVOD), "video on demand", access to the world wide web", "audio on demand", etc. will present the viewer with a plethora of information and bandwidth.

As has become increasingly evident, information overload can actually reduce the usefulness of the information delivered. Accordingly, a great challenge exists to provide an interface that manages and provides an intelligent, user-friendly interface to the information available.

Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. One such challenge is assisting viewers to select programs to view from the vast amount of programming available. As more programming is available the consumer needs more information to assist in selecting, especially in the case of pay-per-view where the consumer must intelligently budget entertainment costs.

SUMMARY OF THE INVENTION

The present invention is a method and system for providing video previews for particular programs selected from an electronic programming guide.

According to one aspect of the invention, a bit stream modulated on a carrier includes preview video packets. When a viewer selects a particular program from an on-screen guide a video stream, including the video packets or signals for the. particular program, is selected and utilized to generate a "preview" video signal. The preview video is then displayed on the screen.

According to another aspect of the invention, the preview video is displayed on only a portion of the screen to allow-the video to be transmitted using less bandwidth.

According to another aspect of the invention, a single video preview is transmitted in a digital data stream as a carousel or endless loop. There are individual bit streams for each preview.

According to another aspect of the invention, several video previews are transmitted in a single bit stream. The different previews are transmitted as a carousel or endless loop.

Other features and advantages of the invention will be apparent in view of the following detailed description and appended drawings.

BRIEF DESCRIPTION OF THE DRAWINGS

FIGS. 5A–5D are schematic diagrams of data structures in the database;

DESCRIPTION OF THE-PREFERRED EMBODIMENT

Overview of the Previewing System

Figure 1:
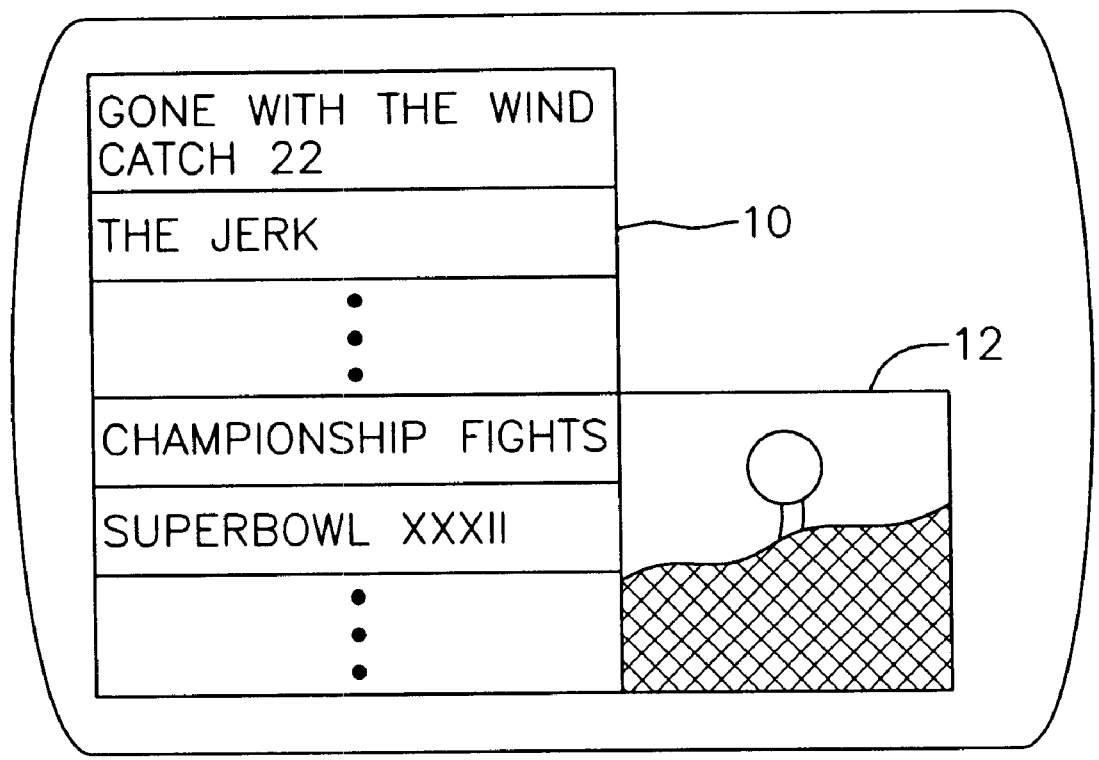
FIG. 1 is a schematic diagram of an EPG and preview window displayed on the screen of a TV system.

FIG. 1 depicts a preferred embodiment of the invention. An electronic program guide depicts movies and/or other programs available from a DBS service. These movies or programs may be available on demand or nearly-on-demand, i.e. with a short wait or can be scanned for future viewing.

The viewer typically accesses an on-screen electronic programming guide (EPG) 10 which displays programming in a grid or matrix with channels listed vertically, times listed horizontally, and guide entries placed in the grid entries-indexed by a particular channel and time.

In the preferred embodiment, the user can activate a guide entry for a particular movie and view a preview, known as a trailer, of the movie in a preview window 12 displayed on the screen. The entry may be activated by first moving the pointer/cursor over the entry in the guide and then clicking to activate the preview or activation can be self-actuated whenever the pointer/cursor is moved over an entry. In a preferred embodiment the preview window 12 is sized so that the video can be smaller to reduce bandwidth requirements.

In a DBS (digital broadcasting system) video baseband signals are digitized, compressed, transmitted. Because of advances in the art of compression, the frequency spectrum once used to transmit a single program can now transmit four programs. Typically, in addition to video signals, other bitstreams encoding information such as audio, VBI (vertical blanking information data such as closed caption and teletext), program guide information, and conditional access information, are provided as separate bitstreams, multiplexed into a composite bit stream, and transmitted.

In a preferred embodiment, a trailer bit stream comprising highly compressed movie trailer video and audio bit streams is formed and provided by a DBS. Each trailer includes header bits identifying the movie and providing other information about the trailer. The header and trailer form a trailer packet. The trailer bit stream is modulated onto the carrier as a carousel or an endless loop so that each trailer is retransmitted cyclically and will be rebroadcast after a short delay.

A decoder at the viewer's location receives carriers and controls a tuner/demodulator to select one carrier. The carrier is sampled, decoded, error-corrected, and demultiplexed to separate the various bit streams. The decoder includes video decoder chips that decompress compressed video to reconstruct pictures of virtually any size.

When the viewer activates the guide to display a trailer, the decoder is controlled to tune to the carrier transmitting the trailer bit stream, select the trailer bit stream from the demultiplexed bit streams, process header bits of each trailer packet to identify the trailer video and audio for the movies selected, decompress the video trailer data, and transfer the decompressed video data as an auxiliary video signal to a picture-within-picture display controller which displays the trailer within the window that is 1/9 the size of the full screen.

Various techniques for activating the preview function may be utilized and are not part of the present invention. For example, an icon in the guide entry may be clicked or a pop-up menu may be utilized.

Overview of an EPG System

Figure 2:
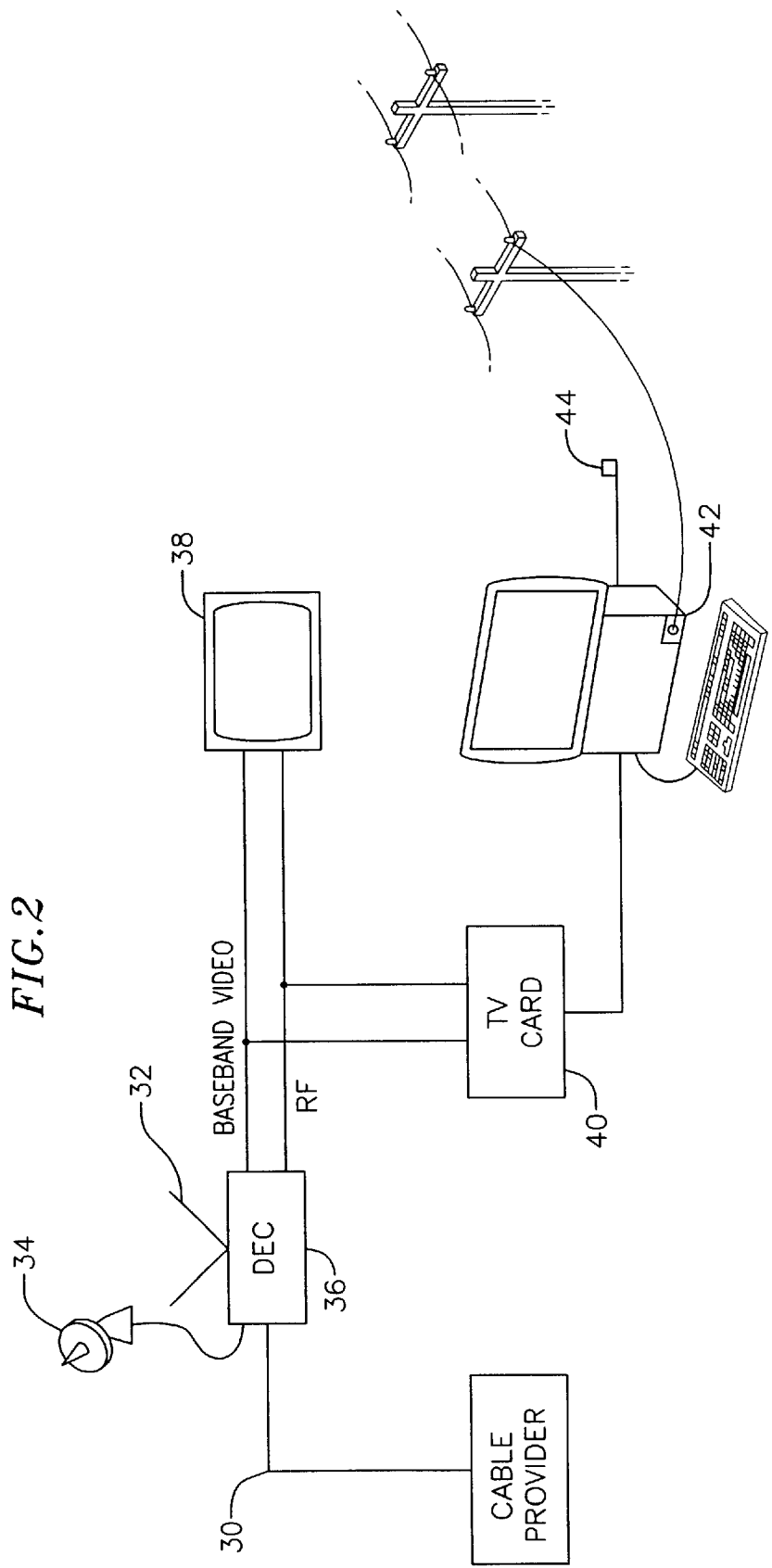
FIG. 2 is a schematic diagram of a TV system.

In a preferred embodiment, the electronic program guide of the invention may be implemented either on a personal computer, a PCTV, a set-top box, or a television including a custom board. However, the invention is not limited to any particular hardware configuration and will have increased utility as new combinations of computers and television systems are developed. In the following any of the above will sometimes be referred to as a "TV system". Block diagrams of representative TV systems are depicted in FIG. 2. Details of implementation are not depicted because the invention is not limited to any particular TV system.

As is well known, the picture to be displayed may be transmitted as an analog signal, for example according to the NTSC standard utilized in the United States, or as a digital signal modulated. The signals may be received over a cable, phone lines, the Internet, or via an antenna or satellite dish. Typically, television sets are designed to receive analog signals and computer display devices are designed to display pictures encoded in a digital format. However, the decoder system converts the digital data to an analog signal for display on a television set.

In FIG. 2, analog or digital TV signals, received via cable 30, antenna 32, or satellite dish 34, are provided to a television system. If the signal is from a digital broadcast service, then a decoder 36 converts the signal to baseband video and audio or channel ¾ RF. If the signal is an analog signal it is passed through as a live video output. The television system 38, depending on its configuration, receives selected ones of the outputs and displays the received program.

A PCTV includes a TV card 40, connected to either live video, baseband video, or channel ¾ output, digitizes the video image and displays the video image in a resizable window on the computer monitor. The PCTV is also coupled to land telephone lines by a modem 42.

If the received signal is an analog TV signal the TV card of the PCTV digitizes the analog signal and extracts included information from the vertical blanking intervals. On the other hand, if the signal is a digital signal separate audio, video, VBI (vertical blanking information such as closed caption, teletext, and program related information), program guide, and conditional access information are provided as separate bitstreams. The video and audio bitstreams for programs are converted to a format for display and the program guide information is processed to form a program guide database. The processor, executing software stored in memory, or available in a "live" digital data stream, generates interactive electronic program guide images and images of received programs. The guide can be used to interact with and control programs displayed in the window.

A television system configured to display an electronic program guide such as a guide provided by StarSight Telecast includes an on-screen display controller and other hardware described below. If a standard analog broadcast signal is received, program guide data is extracted from the VBI by a VBI data slicer and processed to form a program database. If a DBS digital signal is received, either from a satellite or cable, VBI and program data are provided in separate bit streams. The program guide images are either generated locally or remotely and provided to an on-screen display controller. Interactivity is provided via a remote control.

Alternatively, the program guide can be displayed on a computer monitor that interactively controls the television set through, for example, an IR interface, including an IR blaster 44, to generate IR codes to control the television and/or a VCR.

If the electronic guide database is generated locally, the system for creating the electronic programming guide must receive television schedule information and process the received information to create a database. Thus, the system requires a data reception unit, a processor, memory to store program code and a database, an on-screen display generator (OSD), and a control interface for tuning to selected channels.

In one preferred embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 3:
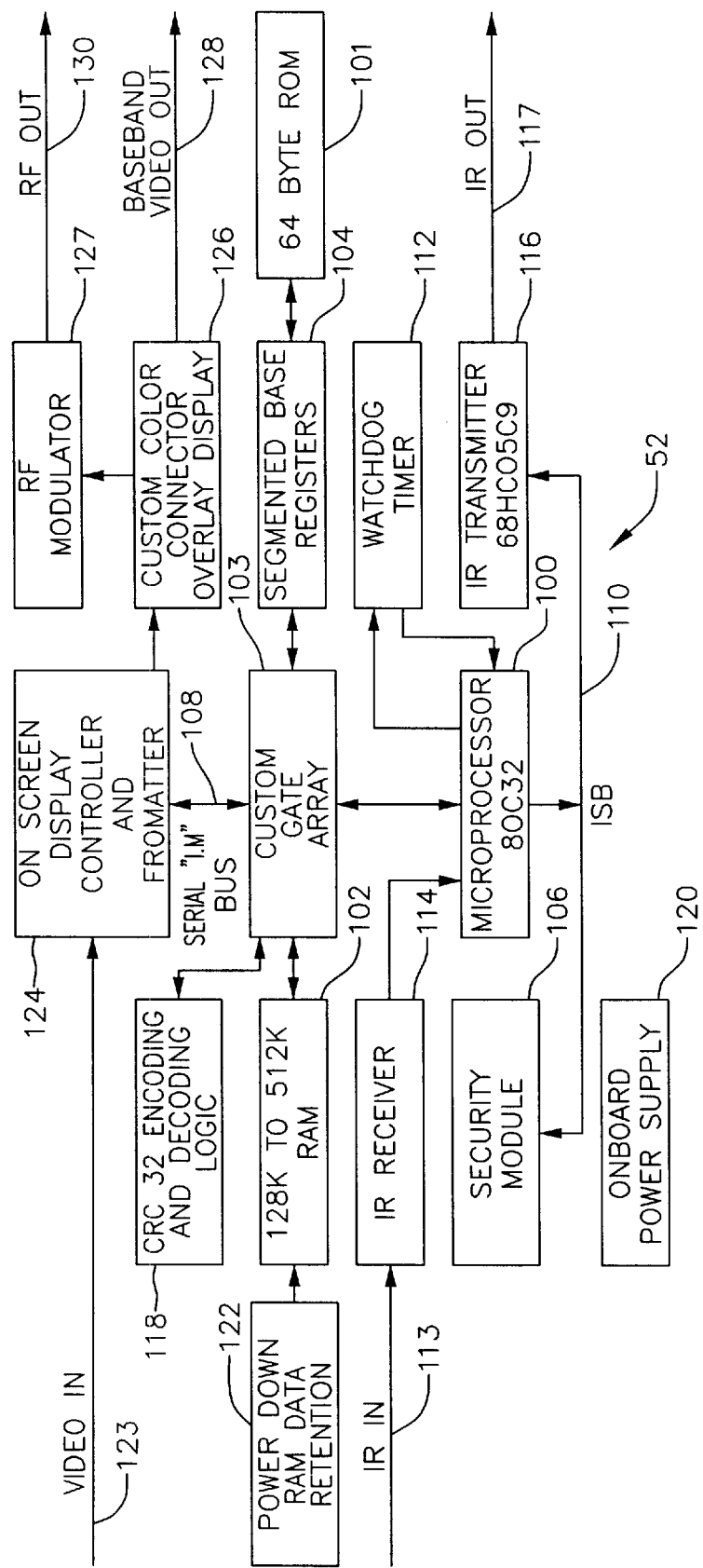
FIG. 3 is a block diagram of a hardware unit for generating an on-screen electronic programming guide (EPG)

In a preferred embodiment, a board is included at a viewer's television set and the database is stored locally and commands are transmitted in the VBIs of programming on a designated channel, for example PBS. An example of a board for receiving program guide information, generating program guide database, displaying the program guide, and interactively controlling the program guide is depicted in FIG. 3. The commands are transmitted to the board in the vertical blanking intervals of programming broadcast on a designated channel.

Alternatively, the commands could be transmitted to the local unit over land telephone lines. Additionally, as described below, in some systems the database is built remotely and the guide itself is transmitted to the local unit.

Figure 4:
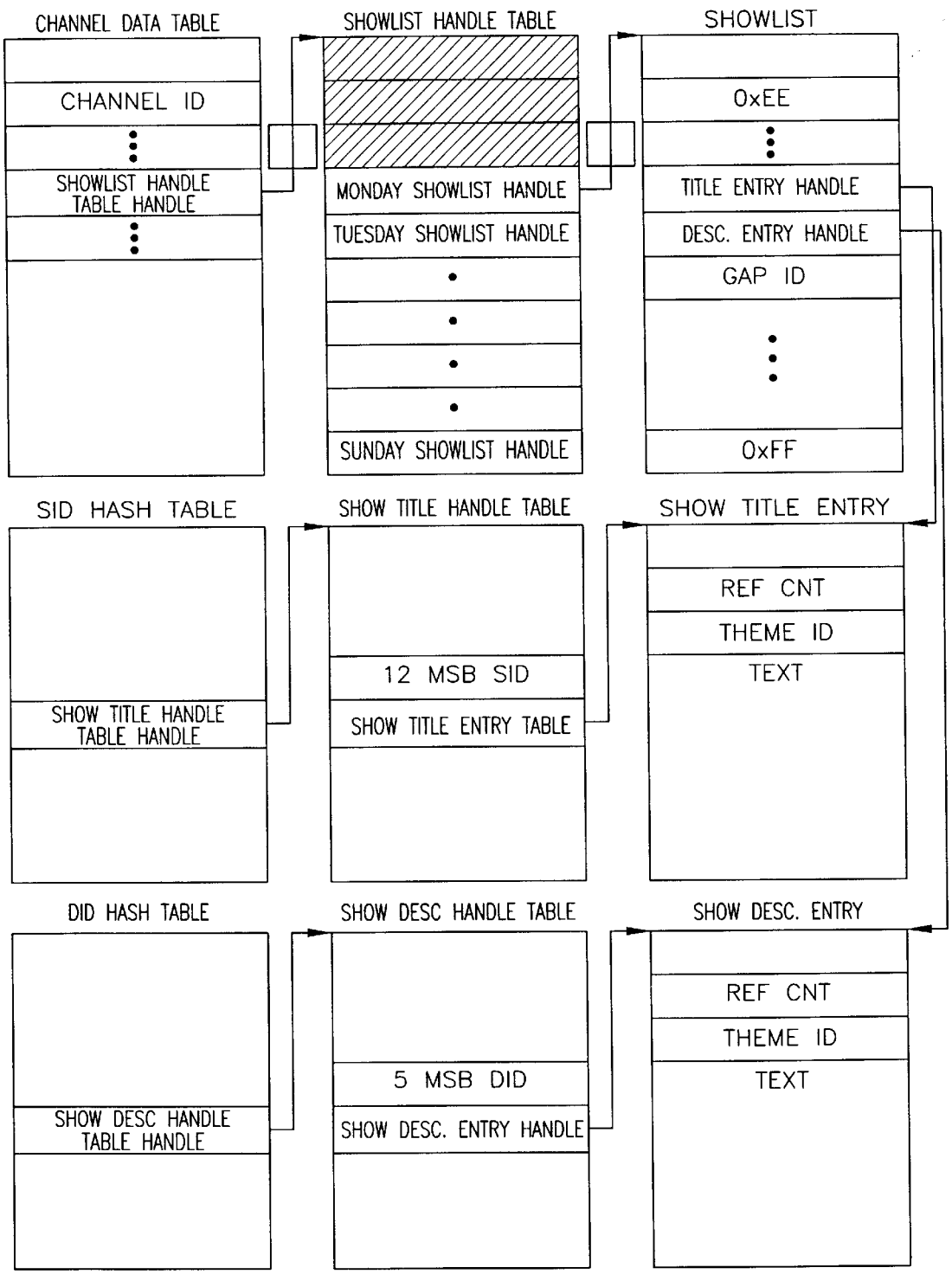
FIG. 4 is a schematic diagram of the hierarchical database utilized to generate the EPG.

The database engine builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where items of the database are stored.

In another embodiment, for example a DSS system, program guide data is transmitted as a bit stream that is processed by the database engine.

Additionally, a N.E.W.S. (new, entertainment, weather, and sports) database has been developed. Commands including story text and story IDs are transmitted. Links from the program guide to stories related to a program can be created and the related stories can be accessed from the guide.

An advertisement database is also created from commands including advertising text and logos including IDs for linking the ads to shows displayed in the EPG. The user may access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode the display is a grid of character codes which are transferred to the OSD controller which generates the on-screen display.

An input-response user interface program module responds to user input to generate new displays responsive to the particular input. In one preferred embodiment, the user utilizes an input device, e.g., a remote control, mouse, or keyboard, to place a pointer over a part of the current display and click. The input-response module responds to the position of the pointer and the particular display currently displayed to generate a responsive display or take a particular action. In another preferred embodiment the user interface responds to function buttons on a remote control. Specific examples will be described below.

DETAILED DESCRIPTION OF THE EPG SYSTEM

Board Description

FIG. 3 is a block diagram an embodiment of the electronic hardware unit 52 utilized to perform the electronic on-screen schedule display and other functions. The particular hardware unit 52 depicted is for TVRO (TV Receive Only) customers having home satellite dishes for television viewing. This unit is coupled in series with existing customer TVRO equipment.

In FIG. 3, the unit receives Baseband Video in 123 from the customer TVRO system. The unit optionally outputs Baseband Video out 128 or channel 3/4 RF out 130. The unit includes an 8-bit microprocessor 100, 64 bytes of code ROM 101, 512 K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, choice of Baseband Video or RF outputs 128 or 130.

The on-screen display controller and formatter (OSDCF) 124 functions as an I/O controller, an on-screen display controller (OSD) and also as a closed-caption data (CCD) VBI data slicer. The VBI (vertical blanking interval) is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog-to-digital convertor (ADC) which digitizes the incoming baseband video and extracts digital information transmitted in the VBIs. As explained more fully below, messages for transmission to the database are transmitted in the VBIs. These messages are transferred to the processor 100 which executes a data base engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming. live video will be. displayed.

Accordingly, screen display graphic data generated by the database engine is transferred to the RAM of the OSD which the generates a local video signal that causes the display screen to be displayed on the television screen.

Scheduling Data Structures

The DBE builds a hierarchical database in the RAM. The hierarchical structure of the database is depicted in FIG. 4,. The database is structured internally as schedule data structures and theme data structures linked by handles and handle tables. Each handle is an index to a handle table which contains pointers to blocks of memory where structures of the database are stored.

The hierarchy for the schedule data structures, in descending order, is:

Channel Data Table: contains subscriber unit's list of channels;

Show List: contains time slots for each show scheduled to be broadcast for a channel;

Show Title: contains the title text and show title attributes;

Show Description: contains show's ratings, attributes, and description text.

A channel data table, depicted in FIG. 5A, is the highest data structure in the hierarchy. This table includes an entry for each channel received by the subscriber unit. The entries in the channel data table are changed infrequently and are determined by the location of the subscriber unit and type of services received. Each channel data table entry includes information concerning the channel and a handle to a show list handle table for the channel.

The next data structure in the hierarchy is the show list depicted in FIG. 5B. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires the entries to be scanned, in order, from the beginning of show list and adding duration values.

The database, when fully constructed, holds a week's worth of show lists for each channel. The days of the week are accessed by incrementing the show list handle by two bytes. The show lists are updated each day at midnight GMT, with the show list for the day just completed being deleted and the show list for same day next week being added to the database.

Figure 5D:
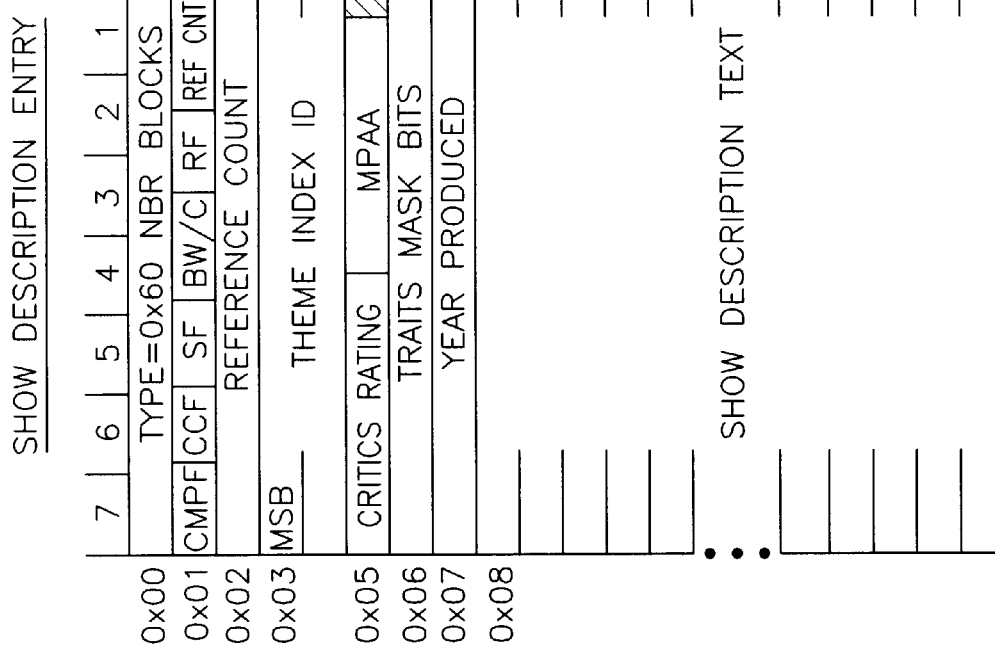
Figure 5C:
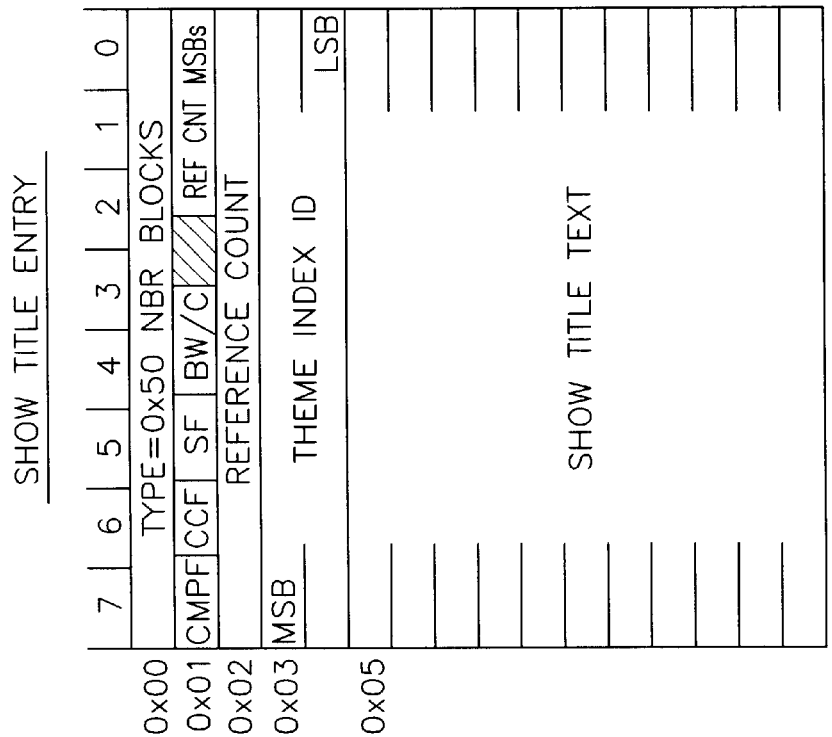

The next data structures in the schedule hierarchy are the show title entries, depicted in FIG. 5C, and show description entries, depicted in FIG. 5D. For a given show slot the show title entry and show description entry are accessed utilizing the handles included in the slot. The show title and show description entries are stored in a memory pool divided into blocks. Each show title is identified by a unique 20-bit show identification number (SID) and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes a theme index ID and the text of the show title. Typically, a single show title entry will be referenced by many show lists for different channels, days, and times. Thus, by utilizing handles in the show lists all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry includes a theme index ID, critic's rating, MPAA rating for the show, traits mask bits, year produced, and show description text. Show description entries tend to have a shorter life than show title entries because a description is only valid for a particular episode of a series.

Schedule Search

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

Ad Data Structures

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each add entry includes an ad banner text field, an ad text field, and a pointer to an ad logo, if appropriate. The ad logo includes a graphics file to be displayed with the ad.

The ad entries include the ad banner text and ad text.

Building the Database

The data base is built by a data base engine software module operating on the processor. Messages comprising discrete commands are received by the database engine. Examples of commands include a Region Command which specifies channels available for a particular subscriber unit to be included in the Channel Data Table; a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The data base engine creates storage locations in memory for all SIDs and DIDs included in any Showlist. Information included in commands having matching SIDs or DIDs is written to the referenced memory area. In practice the SIDs and DIDs are processed by a hashing system for more efficient searching.

The messages may be transmitted to a subscriber unit in various ways. A system for receiving messages in the VBIs of broadcast programming has been described above. In a DBS system the messages may be transmitted in a dedicated bit stream.

In a DBS system video baseband signals are digitized, compressed, and modulated onto analog carrier signals. Because of advances in the art of compression, a carrier once used to transmit a single program can now transmit four programs. Typically, in addition to video signals other bitstreams encoding information such as audio, VBI (vertical blanking information data such as closed caption and teletext), program guide information, and conditional access information, are provided as separate bitstreams, multiplexed into a composite bit stream, and modulated onto a carrier signal.

Figure 6:
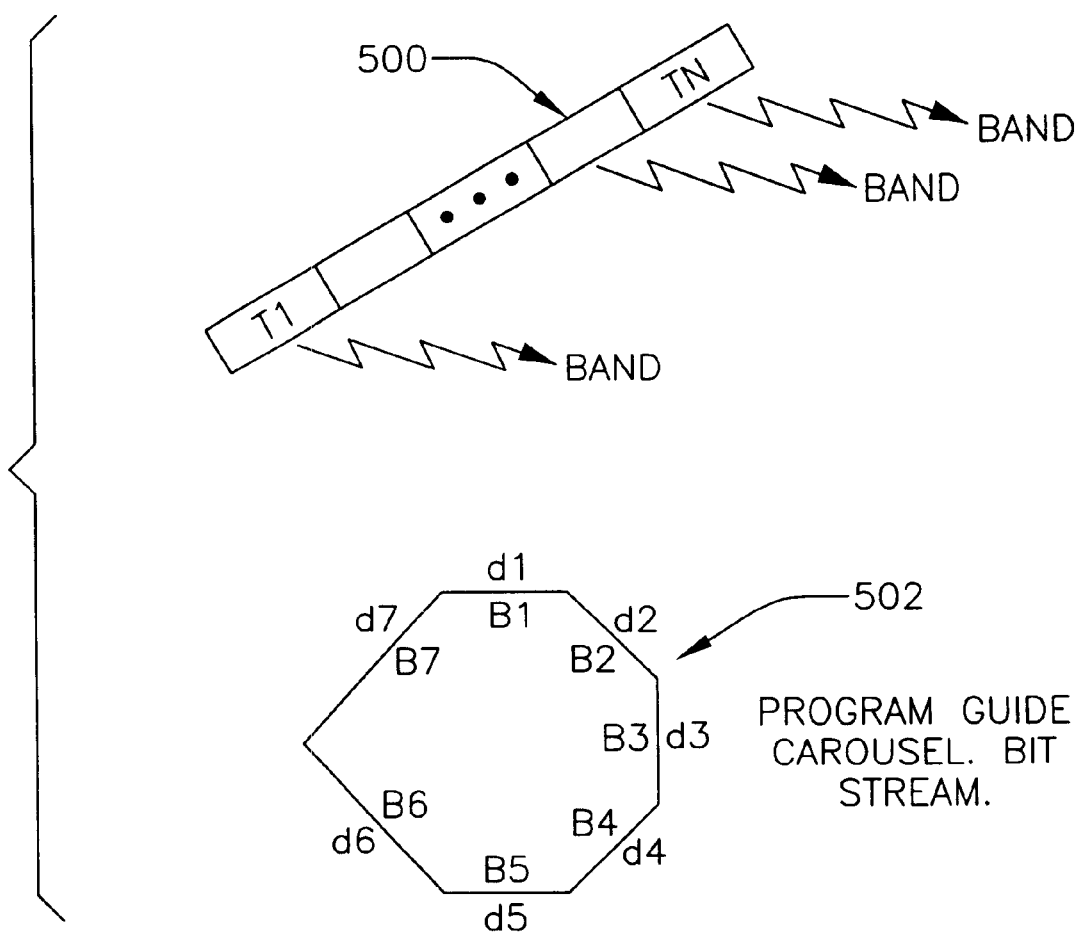
FIG. 6 is a schematic diagram depicting the transmission of an EPG in a digital satellite system.

Alternatively, the database itself may be transmitted in a digital data stream. For example, in DSS the program guide information is transmitted in blocks of 3 hours of programming for 36 channels. Programming is digitally modulated onto different bands. As depicted in FIG. 6, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted as a carousel or endless loop so that there may be a delay before a particular time band is received.

A decoder at the viewer's location receives 16 carriers and controls a tuner/demodulator to select one carrier. The carrier is sampled, decoded, error-corrected, and demultiplexed to separate the various bit streams. The decoder includes video decoder chips which decompress compressed video to reconstruct pictures of virtually any size.

When the viewer accesses the guide the block for that time period is loaded into memory so that the user can interact with the guide. For a future time and different channel there may be a time delay. For example, if the current programming block were B1 and the block currently received is B4 the user must wait for blocks B5, B6, and B7, to be transmitted before the current programming can be received and displayed. The viewer would wait for a time delay equal to the sum of time durations for transmitting each block, i.e., d5+d6+d7. If the program guide block is modulated onto a different band the cable box must tune to the band and wait until the desired block is transmitted on the carousel, so if the guide is accessed for future programming there could be a delay.

For cable the database is built at the SST head end and sent over land-lines to the cable head end. The cable company sends data any way it wants, e.g. VBIs, satellite, digital, etc.

User Interface

The user interface takes remote control commands as its primary input. In one embodiment a user requests various functions by pressing function buttons on a remote control. In another embodiment, the GUI is utilized with different interactive regions on a displayed screen corresponding to different functions. The user moves the cursor over the interactive region corresponding to a desired function and selects the function to generate a command. The particular form of entering a command is not critical and technology for utilizing voice commands may soon be available.

The user interface receives commands and responds with a requested display screen and by performing the function requested by the command. The function performed may be to perform an action such as recording a program, tuning to a channel, accessing a related internet site, purchasing a pay-per-view program, or purchasing merchandise. The data and format of each screen is dependent on the previous screen, time of day, the contents of the data base, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to re-draw the screen if any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer moves the cursor over the record interactive region which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by the on-screen display (OSD) controller based on graphic display commands issued by the database engine. Among the primitive commands needed to draw system display screens are the Erase Screen Command; Draw Rectangle Command; Save Rectangle Command; Restore Rectangle Command; Move Rectangle Commands; Write ASCII String Command; and Draw Channel Icon Command.

Each screen includes areas that are constant and based on code and data stored in non-volatile memory and variable areas such as show titles and descriptions which utilize data stored in the database. As described above in the description of the database engine, the database is structured to facilitate efficient searching for information, generally in the form of ASCII text strings, stored in the database. Additionally, graphics files are also being stored in the database to be displayed in windows of the display screen.

DETAILED DESCRIPTION OF THE PREVIEW UNIT

Figure 7:
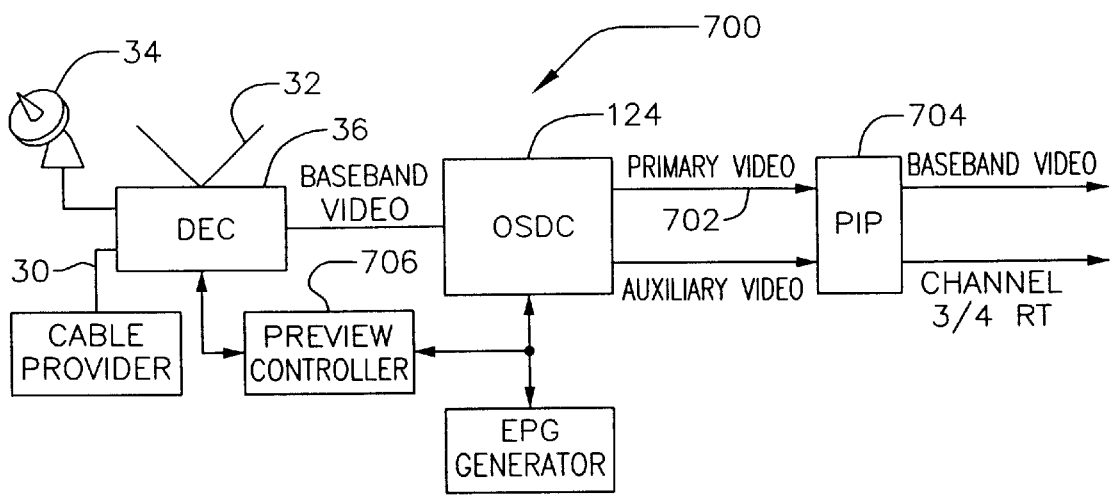
FIG. 7 is a block diagram of the system for displaying preview videos.
Figure 8:
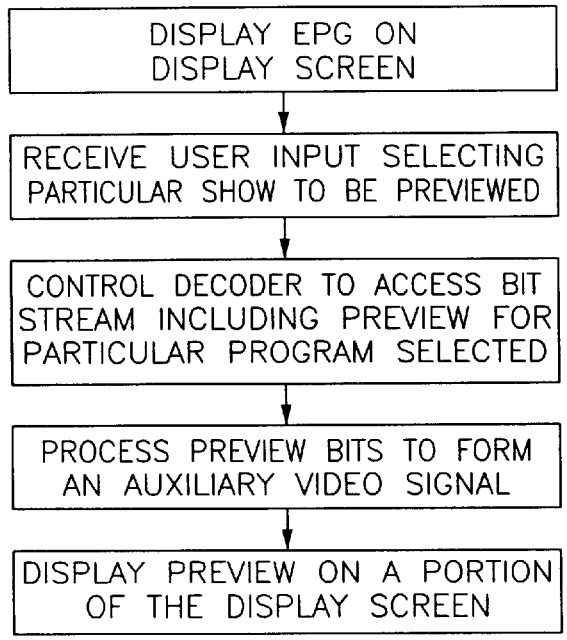
FIG. 8 is a flow chart of the steps for displaying a preview video.

FIG. 7 is a block diagram of one embodiment of the invention and FIG. 8 is flow chart depicting the steps to previewing a program. Referring to FIGS. 7 and 8, an EPG system 700 performs the database engine and user interface functions as described above. An EPG video signal 702 is provided as a primary signal to be displayed on a first portion of a display screen by a picture-in-picture (PIP) controller 704.

A preview controller 706 is provided information identifying a particular program selected by the user. The preview controller 706 controls the decoder 36 to tune to the band carrying the preview bitstream, accesses the demultiplexed bit stream, processes the preview headers to identify a preview packet corresponding to the program identified by the viewer, and controls the decoder to provide an auxiliary video signal displaying the preview video corresponding to the selected program. Additionally, if the preview includes audio the preview controller causes the decoder to process audio bits in the preview packet and provide an audio signal to the television set.

Figure 9:
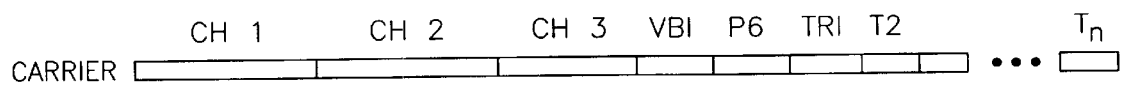
FIG. 9 is a schematic diagram of digital information carried by a carrier.

FIG. 9 schematically depicts the digital information carried by one carrier of a DBS. As described, four channels can be compressed and carried on one carrier. Additionally, VBI information, program guide information, etc. may also be carried. The trailer video streams can also be carried. As described above, if the trailers are displayed in small window the video can be highly-compressed so that the trailer bit streams do not use much of the bandwidth of the carrier.

Figure 10:
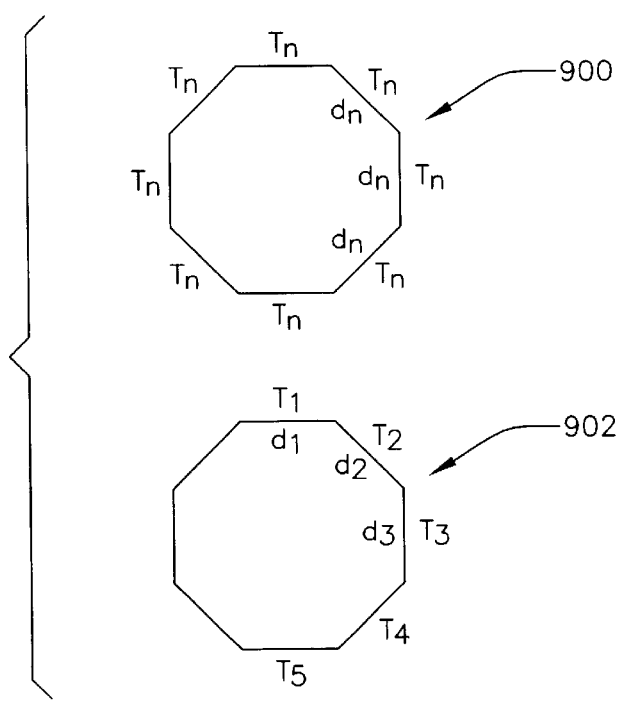
FIG. 10 is a schematic diagram of different carousel or endless loop configurations for transmitting preview packets.

FIG. 10 depicts alternative ways of transmitting the trailers. One trailer bit stream can transmit a single trailer as a carousel 900. Thus, for a particular show the preview controller 706 selects the particular bit stream and the trailer will be displayed with no perceptible delay. Alternatively, a plurality of trailers can be transmitted as a single bit stream. Each trailer is included on a carousel 902. In this embodiment, less bandwidth is required but there may be a perceptible delay before a particular trailer is displayed.

The PIP controller 704 then displays the preview video on a second portion of the display screen. Alternatively, the preview can be displayed on the entire screen. The trailer video could not be as highly-compressed as when viewed in window and more bandwidth of the carrier would be required. The size of the window for displaying the trailer is determined depending on the specification for a particular system.

The invention has been described with reference to the preferred embodiments. Alternatives and substitutions will now be apparent to persons of skill in the art. For example, although the preferred embodiment utilizes a television system the invention is applicable to a PC-TV system. The preview bit stream either is processed by the PC-TV directly to display the preview video or an auxiliary video signal is processed to be displayed within a window.

What is claimed is:

1. A method of providing preview information to assist in selecting video programming, said method comprising:

displaying schedule information on a display screen including source and identification information about one of a plurality of available shows;

receiving user input to select a particular show from said plurality of shows;

receiving user input to initiate a preview operation;

receiving a broadcast signal for a particular channel, the broadcast signal having multiple bit streams of television programing and including a preview bit stream after the user input to initiate a preview operation is received, the preview bit stream being in the form of an endless loop of preview packets in which the preview packets are rotated and transmitted cyclically, such that each preview packets is rebroadcasted after a short delay and the preview packets represent video previews of available shows;

processing a received preview packet representing a video preview of the particular show to form a video signal; and displaying the video preview of the particular show on the screen responsive to the video signal;

wherein the preview bit stream has a reduced bandwidth to occupy a small portion of the broadcast signal for the particular channel.

2. The method of claim 1 further comprising the steps of:

receiving said video preview in compressed form; and decompressing said video preview to displaying the video preview.

3. The method of claim 1 wherein said step of selecting comprises the steps of:

highlighting a particular show with a cursor or pointer.

4. The method of claim 2 wherein the receiving a preview bit stream step comprises receiving a preview bit stream in the form of an endless loop of a plurality of preview packets, each preview packet including header information and compressed video information, and wherein the method further comprises the step of utilizing said header information to identify a particular preview packet in said endless loop that is associated with the particular show selected.

5. The method of claim 2 wherein the receiving a preview bit stream step comprises receiving a preview bit stream in the form of an endless loop of a single preview packet repeated a plurality of times, said preview packet including header information and compressed video information, and wherein the method further comprises the step of utilizing said header information to identify a particular preview packet in said endless loop that is associated with the particular show selected.

6. The method of claim 1, 2, 3, 4, or 5 further comprising the step of:

displaying said preview in window that is smaller than the display screen.

7. The method of claim 1, 2, 3, 4 or 5 further comprising the step of:

displaying said preview on the entire display screen.

8. A method of providing preview information to assist in selecting video programming, said method comprising:

displaying schedule information on a display screen including source and identification information about one or a plurality of available shows;

receiving user input to select a particular show from said plurality of shows and self-activate the initiation of a preview operation;

receiving a broadcast signal for a particular channel, the broadcast signal having multiple bit streams of television programing and including a preview bit stream, upon the self-activation of a preview operation, the preview bit stream being in the form of an endless loop of preview packets in which the preview packets are rotated and transmitted cyclically, such that each preview packet is rebroadcasted after a short delay; and displaying a preview including a video preview of the particular show on the screen;

wherein the preview bit stream has a reduced bandwidth to occupy a small portion of the broadcast signal for the particular channel.

9. The method of claim 8 further comprising the steps of:

receiving said video preview in compressed form; and decompressing said video preview to displaying the video preview.

10. The method of claim 8 wherein said step of selecting comprises the steps of:

highlighting a particular show with a cursor or pointer.

11. The method of claim 9 wherein the receiving a preview bit stream step comprises receiving a preview bit stream in the form of an endless loop of a plurality of preview packets, each preview packet including header information and compressed video information, and wherein the method further comprises the step of utilizing said header information to identify a particular preview packet in said endless loop that is associated with the particular show selected.

12. The method of claim 9 wherein the receiving a preview bit stream step comprises receiving a preview bit stream in the form of an endless loop of a single preview packet repeated a plurality of times, said preview packet including header information and compressed video information, and wherein the method further comprises the step of utilizing said header information to identify a particular preview packet in said endless loop that is associated with the particular show selected.

13. The method of claim 8, 9, 10, 11, or 12 further comprising the step of:

displaying said preview in window that is smaller than the display screen.

14. The method of claim 8, 9, 10, 11, or 12 further comprising the step of:

displaying said preview on the entire display screen.

15. A system for previewing selected programs comprising:

a television system for displaying video signals provided as baseband video signal or RF signals;

a decoder for receiving digital signals for a particular channel, the digital signals encoded with multiple bit streams of television programing, providing selected bit streams, and converting a selected bit stream into a video signal, with one of the bit streams being a preview bit stream including preview packets received from a service provider in the form of an endless loop of preview packets in which the preview packets are rotated and transmitted cyclically, such that each preview packet is rebroadcasted after a short delay, each preview packet including a header identifying the preview and compressed preview video bits;

a display controller, coupled to receive primary and auxiliary video signals, for displaying the primary video signal on a first portion of the display screen and the auxiliary video signal on a second portion of the display screen;

an EPG system for providing an EPG video signal for displaying an electronic guide as a primary signal, for providing a user interface that receives user input selecting a particular program displayed in an EPG; and a preview controller, coupled to the decoder to receive the preview bit stream, for inspecting said headers to identify a selected preview packet;

wherein the EPG system, upon receiving the user input selecting the particular program, directs the preview controller, controlled by the EPG system, to select a particular preview packet and to control the decoder to convert the preview video bits in the selected preview packet to an auxiliary video signal so that the auxiliary signal will display a preview of the particular channel on the second portion of the display screen, and wherein the preview bit stream has a reduced bandwidth to occupy a small portion of the broadcast signal for the particular channel.

16. The method of claim 15 wherein said digital signal is a DBS signal.

17. The method according to claim 1 further comprising the step of embedding the preview bit stream in the form of an endless loop of preview packets in a signal transmitted from the service provider.

18. The method according to claim 8 further comprising the step of embedding the preview bit stream in the form of an endless loop of preview packets in a signal transmitted from the service provider.

* * * * *